United States Patent
Reinbold et al.

(10) Patent No.: US 10,328,995 B2
(45) Date of Patent: Jun. 25, 2019

(54) MULTI-SPROCKET ARRANGEMENT FOR A BICYCLE

(71) Applicant: SRAM DEUTSCHLAND GMBH, Schweinfurt (DE)

(72) Inventors: Matthias Reinbold, Würzburg (DE); Cole St. John, Gochsheim (DE)

(73) Assignee: SRAM DEUTSCHLAND GMBH, Schweinfurt (DE)

( * ) Notice: Subject to any disclaimer, the term of this patent is extended or adjusted under 35 U.S.C. 154(b) by 103 days.

(21) Appl. No.: 15/236,652

(22) Filed: Aug. 15, 2016

(65) Prior Publication Data

US 2017/0043840 A1 Feb. 16, 2017

(30) Foreign Application Priority Data

Aug. 13, 2015 (DE) .................... 20 2015 005 643 U

(51) Int. Cl.
*B62M 9/10* (2006.01)
*F16H 55/30* (2006.01)
*F16H 57/00* (2012.01)

(52) U.S. Cl.
CPC ............... *B62M 9/10* (2013.01); *F16H 55/30* (2013.01); *F16H 2057/0056* (2013.01)

(58) Field of Classification Search
CPC .... B62M 9/10; F16H 55/36; F16H 2057/0056
See application file for complete search history.

(56) References Cited

U.S. PATENT DOCUMENTS

| 7,427,251 | B2 | 9/2008 | Reiter et al. |
| 8,057,338 | B2 | 11/2011 | Kamada |
| 8,968,130 | B2 | 3/2015 | Liao et al. |
| 9,193,416 | B2 | 11/2015 | Tokuyama et al. |
| 10,093,390 | B2 | 10/2018 | Braedt et al. |
| 2008/0004143 | A1 | 1/2008 | Kanehisa |
| 2010/0075791 | A1* | 3/2010 | Braedt ..................... B62M 9/10 474/160 |

(Continued)

FOREIGN PATENT DOCUMENTS

| CN | 202765219 | 3/2013 |
| DE | 102007010456 | 12/2007 |

(Continued)

*Primary Examiner* — Michael R Mansen
*Assistant Examiner* — Robert T Reese

(57) ABSTRACT

A multi-sprocket arrangement for installation on a rear wheel axle of a bicycle includes a sprocket assembly. The sprocket assembly has at least a first sprocket and a second, self-supporting sprocket. The second sprocket is connected to a holding body via the first sprocket by way of a separate, cylindrical fastener which extends parallel to the rear wheel axle. The fastener has a first and a second end which are connected in frictionally fit fashion to drilled holes in the first and second sprockets. The frictionally fit connection between the fastener and the drilled holes of the sprockets prevents an axial movement of the first and second sprockets toward one another. The fastener is additionally connected, at the first and second ends, in form-fitting fashion, to the first and second sprockets such that an axial movement of the first and second sprockets away from one another is also reliably prevented.

18 Claims, 6 Drawing Sheets

(56) References Cited

U.S. PATENT DOCUMENTS

| | | | |
|---|---|---|---|
| 2011/0105263 A1* | 5/2011 | Braedt | B62M 9/10 474/160 |
| 2012/0244977 A1 | 9/2012 | Liao | |
| 2015/0024884 A1 | 1/2015 | Braedt | |

FOREIGN PATENT DOCUMENTS

| | | |
|---|---|---|
| DE | 102010027228 | 5/2011 |
| DE | 102014010700 | 1/2015 |

* cited by examiner

MULTI-SPROCKET ARRANGEMENT FOR A BICYCLE

This application claims priority to, and/or the benefit of, German utility model application DE 20 2015 005 643.1, filed on Aug. 13, 2015.

BACKGROUND OF THE INVENTION

The invention relates to a multi-sprocket arrangement which is provided for installation on a rear wheel axle of a bicycle and which has a holding body and a sprocket assembly. The sprocket assembly is composed of at least a first sprocket, which is fixed radially and axially to the holding body, and a second, self-supporting sprocket. The second sprocket is connected to the holding body via the first sprocket by way of at least one separate, cylindrical fastener which extends parallel to the rear wheel axle. The fastener has a first and a second end which are connected in frictionally fit fashion to drilled holes in the first and second sprockets. The frictionally fit connection between the fastener and the drilled holes or the sprockets prevent the first and second sprockets from moving toward one another in an axial direction.

Multi-sprocket arrangements for bicycle gearshift arrangements on rear wheel axles are normally mounted rotatably on the rear wheel axle by way of a driver with freewheel mechanism. The driver engages with the rear wheel axle via a freewheel clutch and permits a transmission of torque in the direction of rotation or drive direction and permits freewheeling, without transmission of torque, in the reverse direction of rotation. To optimize the selection of the transmission ratio, the number of sprockets is ever-increasing in modern bicycle gearshift arrangements. In particular, the use of very small sprockets with ten or even fewer teeth, and correspondingly small sprocket outer and sprocket inner diameters, is playing an ever greater role. The sprocket inner diameters are in some cases smaller than the outer diameter of the driver or of the holding body, such that said sprockets can no longer be pushed onto and fastened to said driver or holding body. Very small sprockets require alternative and space-saving fitting, for example laterally adjacent to the driver. This alternative fitting of the self-supporting sprocket however also gives rise to disadvantages. Furthermore, with the increasing number of sprockets, both the weight and the manufacturing costs of the assembly increase. There are various approaches in the prior art for attempting to overcome said disadvantages.

In order to save manufacturing costs despite the large number of sprockets, one approach is for the sprockets to be manufactured individually and connected by way of separate fasteners. In particular, the punching of individual sprockets is an inexpensive option. By contrast to an integrally formed multi-sprocket arrangement formed from a blank by turning and milling operations, said punched and subsequently connected individual sprockets are inexpensive and quick to manufacture.

A cassette of said type manufactured from individual sprockets and connected by way of simple pins is known from DE 10 2014 010 700 A1. The supporting structure of the sprocket arrangement yields, overall, a hollow body in the form of a cone. The entire cone hollow body is in contact with the driver only at two axially mutually spaced-apart positions, and is supported radially there. At said two positions, the two supporting sprockets are normally also fixed in an axial direction. The conical shape of the hollow body arises because the individual sprockets (aside from the two supporting sprockets) do not extend as far as the driver. This construction saves material and weight. Adjacent individual sprockets are connected to one another in frictionally fit fashion by way of pins that are pressed into drilled holes in the sprockets.

DE 10 2010 027 228 A1 likewise presents bolts which connect the first and second sprockets to one another in frictionally fit fashion. It is also described that an abutment collar can function as a spacer between adjacent sprockets. During the installation process, the bolts are, in a first step, pressed by way of the first end thereof into the receiving openings of a first sprocket. In a second installation step, the adjacent second sprocket is then pressed onto the second end, which remains free, of the bolt. The pressing action gives rise to a form fit between the bolt and the sprockets. Furthermore, during the pressing of the pins into a hole arrangement, it is possible for an encircling bead of low height to be formed, the action of which is similar to that of an abutment collar.

It has however been found that, in the presence of cyclic bending caused by the circulating circumferential load of the chain on the sprockets, the above-discussed frictional fit between pin/bolt and sprocket is not sufficient to ensure a secure connection. In particular, the self-supporting sprockets, which axially are not fixed in both directions or are not arranged and braced between the axially fixed sprockets (supporting sprockets), are at risk of moving apart or even becoming detached under load. A secure connection of the multi-sprocket arrangement is put at risk.

A purely form-fitting connection of adjacent sprockets by way of bolts which are deformed at the ends, together with spacers, is known from DE 10 2007 010 456 A1. The spacers are intended to facilitate the installation process. They are furthermore required because the form-fitting connection of the sprockets duly accommodates axial forces which move the sprockets apart from one another but not axial forces which move the sprockets toward one another. To also accommodate these axial forces, a spacer must be fitted between adjacent sprockets. Said further component entails costs, weight and additional installation outlay.

Furthermore, it remains to be stated that the structural space between rear wheel hub and bicycle frame is predefined. That is to say, the increasing number of sprockets must be accommodated in the same structural space. This demands a space-saving arrangement in an axial direction.

SUMMARY

It is the object to provide a multi-sprocket arrangement which ensures the accommodation of axial forces in both directions, but in so doing does not exceed the predefined structural space and can be manufactured both inexpensively and easily.

It is a further object to design the multi-sprocket arrangement such that no additional spacer elements are required between adjacent sprockets.

The solution proposes that, in addition to the frictional fit, a form fit be produced between connecting element and sprocket in order to accommodate the acting axial forces in both directions. Below, the multi-sprocket arrangement in a fully installed state will be discussed.

The multi-sprocket arrangement is suitable for installation on a rear wheel axle of a bicycle and has a holding body, which is designed for installation on the rear wheel axle, and a sprocket assembly. The sprocket assembly has a first sprocket and a second sprocket. The first sprocket is fixed radially and axially to the holding body. The second sprocket is of self-supporting design. The second sprocket is connected to the holding body via the first sprocket by way of a separate fastener. The fastener has a cylindrical shape with a first and a second end, extends parallel to the rear wheel axle, and is connected in frictionally fit fashion to drilled holes in the first and second sprockets, such that an axial movement of the first sprocket and of the second sprocket toward one another is prevented. The fastener is additionally connected, at the first and second ends, in form-fitting fashion to the first and second sprockets, such that an axial movement of the first and second sprockets away from one another is prevented.

The holding body may be the driver itself, a terminating sleeve which is connected to the driver, or a similar element which is suitable for holding the sprocket assembly and connecting said sprocket assembly to the rear wheel axle of a bicycle.

It is normally the case that two first sprockets, preferably the largest sprocket and a smaller sprocket spaced apart therefrom, are fixed radially and axially to the holding body (supporting sprocket) and preloaded toward one another. The preload may be applied to the sprockets for example by way of the terminating sleeve or a terminating ring. By contrast, the second sprocket is of self-supporting design. That is to say, the second sprocket is not axially preloaded, and the self-supporting second sprocket is connected to the first sprocket only in one direction. The force that is transmitted from the chain to the multi-sprocket arrangement can be conducted away only in the direction of the first sprocket. The additional form-fitting connection prevents an undesired movement of the second sprocket away from the first sprocket.

The second sprocket is connected to the holding body via the first sprocket by way of the fastener. Both the direct connection and an indirect connection are possible. That is to say, the second sprocket may be connected directly to an adjacent first sprocket, or further sprockets may be arranged between the first and the second sprocket, via which the first and second sprockets are indirectly connected.

The frictionally fit connection basically accommodates axial forces in both directions. However, the frictional fit is configured such that at least an axial movement of adjacent sprockets toward one another is prevented. The frictionally fit connection withstands both the preload of the multi-sprocket arrangement and the loads exerted by the chain. The additional form-fitting connection fixes the sprockets in both axial directions. The design ensures a secure connection without the use of further components such as are known from the prior art. Installation outlay, costs and weight are kept low, and also, the required structural space is not increased.

It is preferably the case that the fastener has a central part with a first diameter $d_1$ and has a first and a second end with a second diameter $d_2$.

The first diameter $d_1$ of the fastener is preferably larger than a hole diameter $L_1$ of the drilled hole. The frictional fit between the fastener and the first and second sprockets is generated by way of the size difference of the diameters $d_1$ and $L_1$.

The first diameter $d_1$ of the fastener preferably has an oversize of approximately 2.5 percent in relation to the hole diameter $L_1$ of the drilled hole. An adequate frictional fit is generated by way of this oversize.

The oversize must be selected such that, firstly, an adequate frictional fit is generated between components and, secondly, the required pressing-in force is not unduly large. The first diameter $d_1$ of the fastener particularly preferably has a dimension of approximately 2.54 mm, and the hole diameter $L_1$ of the drilled hole particularly preferably has a dimension of approximately 2.48 mm. By way of this oversize of approximately 0.06 mm, an adequate frictional fit is generated between the fastener and the first and second sprockets. An axial movement of the sprockets toward one another is thus reliably prevented and a secure connection is ensured.

It is preferably the case that the fastener is pressed into the drilled hole, and the frictional fit generated, with a force of approximately 6500 N. This type of connection is also referred to as an interference fit. The pressing-in force must be dimensioned such that, firstly, clean pressing-in of the fastener, and thus an adequate frictional fit, are ensured, and secondly, no undesired plastic deformation of the fastener occurs.

The sprockets are particularly preferably composed of a harder material than the fastener. It is thereby ensured that the relatively soft fastener shears off in accordance with the oversize during the pressing-in into the drilled hole of the sprocket, and not vice versa. The drilled hole may additionally expand slightly during the pressing-in process.

The second diameter $d_2$ of the fastener is preferably larger than the hole diameter $L_1$ of the drilled hole. The form fit between the fastener and the first and second sprockets is generated owing to the size difference of the diameters $d_2$ and $L_1$.

The second diameter $d_2$ of the fastener may be approximately 8 percent to 16 percent larger than the hole diameter $L_1$ of the drilled hole. By way of said diameter difference, an adequate form fit is generated between the fastener and the sprocket.

In an embodiment, the second diameter $d_2$ of the fastener to have a dimension from 2.69 mm to 2.89 mm, and for the hole diameter $L_1$ of the drilled hole in the first and/or second sprocket to have a dimension of approximately 2.48 mm. Said diameter difference of 0.21 mm to 0.41 mm produces an adequate form fit between the ends of the fastener and the first and second sprockets. An axial movement of the sprockets away from one another is reliably prevented, and a secure connection is ensured.

In an embodiment, the second diameter $d_2$ of the fastener is preferably generated by deformation of the first and second ends of the fastener.

In its original form, the fastener has a first diameter $d_1$ over its entire extent. The fastener with the first diameter $d_1$ is pressed into the drilled hole of a sprocket and is thus connected thereto in frictionally fit fashion. The fastener is pressed into the drilled hole to such an extent that an end of the fastener protrudes beyond the drilled hole slightly. Said projecting length is then deformed to the size of the second diameter, such that a form fit is realized between fastener and sprocket.

The fastener is preferably in the form of a pin. Alternatively, the fastener may be in the form of a rivet, bolt, hollow pin or a similar component which has a cylindrical shape.

The deformation may be performed in particular by pressing of the fastener using a punch, by crimping of a hollow pin by way of a crimping tool, or by flaring or spreading of the fastener using a mandrel. It is particularly preferable for a deformation force of 7000 N to be applied to each of the two ends of the pin simultaneously by way of a press or a punch, which deformation force deforms the ends. By way of the simultaneous application of the deformation force, the pin is duly deformed but is also kept in balance and is not inadvertently displaced in the drilled hole. The deformation force of approximately 7000 N is higher than the pressing-in force of approximately 6500 N, such that the fastener is not already deformed when it is pressed into the drilled hole.

The pin preferably has a first cutout at the first end and a second cutout at the second end. The cutouts facilitate the deformation of the pin and are dimensioned such that a defined deformation of the ends is made possible. In particular, a tool can be mounted in, or inserted into, the cutout for deformation purposes.

The pin preferably has a rivet collar at the first and second ends. The deformation of the ends is defined in a manner dependent on the size and geometry of the rivet collar. The geometry of the rivet collar furthermore permits a deformation using a simple tool, such as a smooth punch.

The fastener preferably has a bead in the region of its central part. During the pressing of the first end of the fastener into a drilled hole, the oversize has the effect that the fastener is sheared off. The material displaced as a result of the shearing-off action collects as an encircling bead along the circumference of the drilled hole and prevents an axial movement between sprocket and fastener in the direction of the bead. The encircling bead thus performs the function of an abutment collar. Such bead formation likewise occurs during the pressing of the next sprocket onto the second end of the fastener. Thus, adjacent sprockets are held with a defined spacing to one another by the beads. By way of the beads, the sprockets are fixed in an axial direction in addition to the form fit.

The drilled hole is preferably equipped with a bevel. The bevel at least partially receives the deformed ends of the fastener. In this way, a form fit is ensured without an excessively large projecting length beyond the sprocket surface in an axial direction being generated. A space-saving arrangement is made possible, and a collision with the chain is prevented.

The second sprocket preferably has a smaller outer diameter than the first sprocket. The self-supporting second sprocket thus has fewer teeth than the axially fixed first sprocket, and is accordingly arranged further to the outside in an axial direction than the first sprocket. It is particularly preferable for the two smallest sprockets of the multi-sprocket arrangement to be of self-supporting design and to be connected in frictionally fit and form-fitting fashion by way of fastener to the third-smallest sprocket, which is fixed axially and radially to the holding body.

Alternatively, the second sprocket has a larger outer diameter than the first sprocket. The self-supporting second sprocket thus has a greater number of teeth than the first sprocket, and is accordingly arranged further to the inside in an axial direction. Correspondingly, the second sprocket is one of the largest sprockets of the multi-sprocket arrangement with, for example, 42 or more teeth, and is arranged in a free space between the holding body and the spokes of the rear wheel.

The combination of a second sprocket with a smaller outer diameter than the first sprocket and a further second sprocket with a larger outer diameter than the first sprocket is also possible. Correspondingly, the self-supporting sprockets are then arranged on both sides of the first sprocket.

The connection of multiple individual sprockets by way of a frictional fit and a form fit may be used in combination with other connection types. For example, it would be conceivable for only the self-supporting sprockets to be connected in frictionally fit and form-fitting fashion, because it is these that are most at risk of inadvertent detachment. A purely frictionally fit connection would be adequate for the other, non-self-supporting sprockets.

The connection is basically expedient in any situation where increased demands are placed on the stability of the multi-sprocket arrangement. One conceivable use would be in the case of electric bikes which are equipped with an electric motor, and the components of which are, in part, subjected to higher forces than those in the case of normally operated bicycles.

BRIEF DESCRIPTION OF DRAWINGS

The construction and function of the multi-sprocket arrangement will now be described in the basis of the example of the preferred embodiments.

The directional terms front/rear, left/right and top/bottom that are used relate to a bicycle viewed in a direction of travel. The terms axial and radial relate to the rear wheel axle A. Accordingly, for example, the largest sprocket of the multi-sprocket arrangement is arranged further to the left (or axially further to the inside) than the smallest sprocket of the multi-sprocket arrangement, and the teeth of the smallest sprocket are situated radially further to the inside than those of the largest sprocket.

DETAILED DESCRIPTION

Figure 1A:
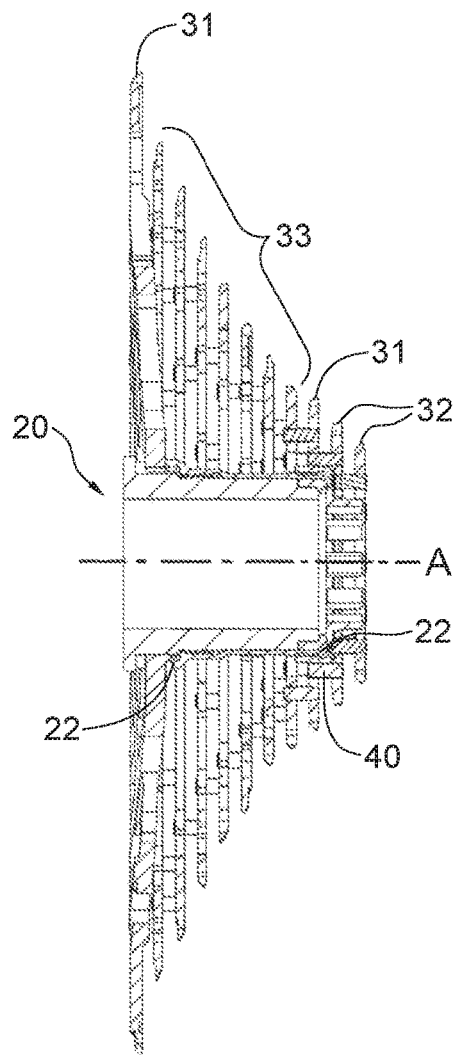
FIG. 1a shows a sectional view and FIG. 1b shows a perspective sectional view of a first embodiment of the multi-sprocket arrangement.
Figure 1B:
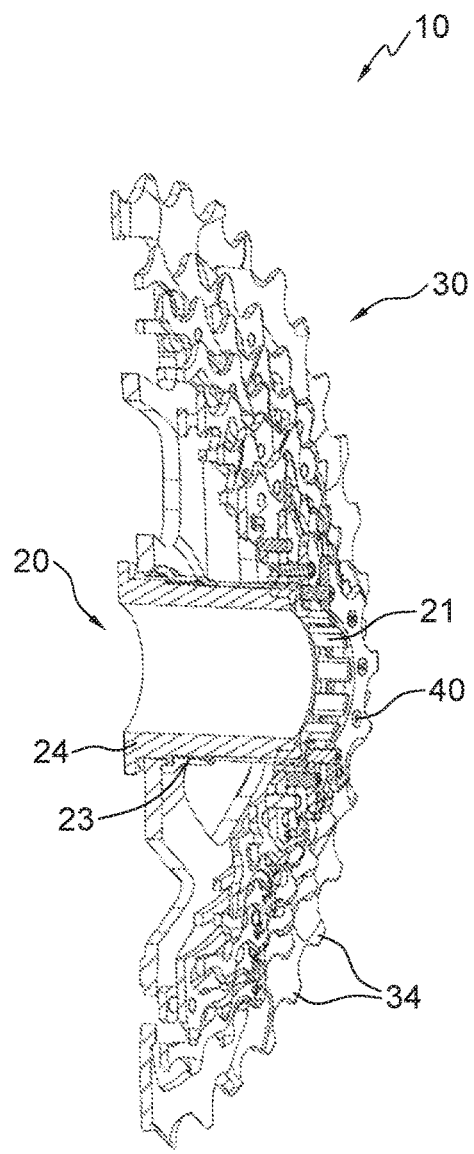

FIG. 1a shows a sectional view and Figure 1b shows a perspective sectional view of the multi-sprocket arrangement 10 with a sprocket assembly 30 installed on a holding body 20. The holding body 20 is suitable for installation on a rear wheel axle or hub. In the exemplary embodiment shown in Figure 1b, the holding body 20 is composed of a driver 24 and of a terminating sleeve 23. Other embodiments, in which the sprocket assembly is for example connected directly to the hub without a driver, or is fitted directly to the driver without a terminating sleeve and is held by a terminating ring, are however also possible.

The illustrated sprocket assembly 30 has two first sprockets 31—the largest and the third-smallest sprocket—and two second sprockets 32—the two smallest sprockets. The first sprockets 31 are fixed radially and axially to the holding body 20. The axial fixing of the sprockets 31 is performed at the two abutments 22 of the terminating sleeve 23.

Between the two first sprockets 31 there are arranged further sprockets 33 which, for weight-saving purposes, do not extend as far as the holding body 20 and are not supported radially on said holding body. The further sprockets 33 are connected both to one another and to the first sprockets 31, and are held in position, by way of a multiplicity of pins. The third-smallest sprocket 31 is preloaded in the direction of the largest sprocket 31 by way of the terminating sleeve 23, which is to be screwed to the driver 24, such that the further sprockets 33 situated between said third-smallest sprocket and largest sprocket are also preloaded. A purely frictionally fit connection of the further sprockets 33 both to one another and to the adjacent first sprockets 31 by way of non-deformed pins is generally adequately stable.

The drive sprocket is normally the largest sprocket 31 with the largest number of teeth 34. It is connected in torque-transmitting fashion to the driver 24. The remaining sprockets 31, 32, 33 normally do not transmit torque to the driver 24. Torque is thus conducted away in the direction of the drive sprocket 31, and is transmitted from there to the driver 24.

The second sprockets 32 are of self-supporting design. The second sprockets 32 are connected either directly or indirectly to an adjacent first sprocket 31 which is fixed both radially and axially to the holding body 20. In the case of an indirect connection, further self-supporting second sprockets 32 may be arranged between the first sprocket 31 and the second sprocket 32. The two second sprockets 32 are arranged, further to the outside in an axial direction, adjacent to the driver 24, such that the inner diameter of the sprocket 32 may be designed to be smaller than the outer diameter of the driver 24 or of the holding body 20. This arrangement permits the use of very small sprockets with a very small number of ten or even fewer teeth 34. Embodiments with only one or with multiple second sprockets are likewise conceivable. The two second sprockets 32 and the third-smallest first sprocket 31 are connected in frictionally fit and form-fitting fashion by way of pins 40. The pins 40 are pressed together with the sprockets 31, 32 in frictionally fit fashion, and are deformed or riveted at their ends 42a, 42b and are thus also connected in form-fitting fashion.

Figure 2:
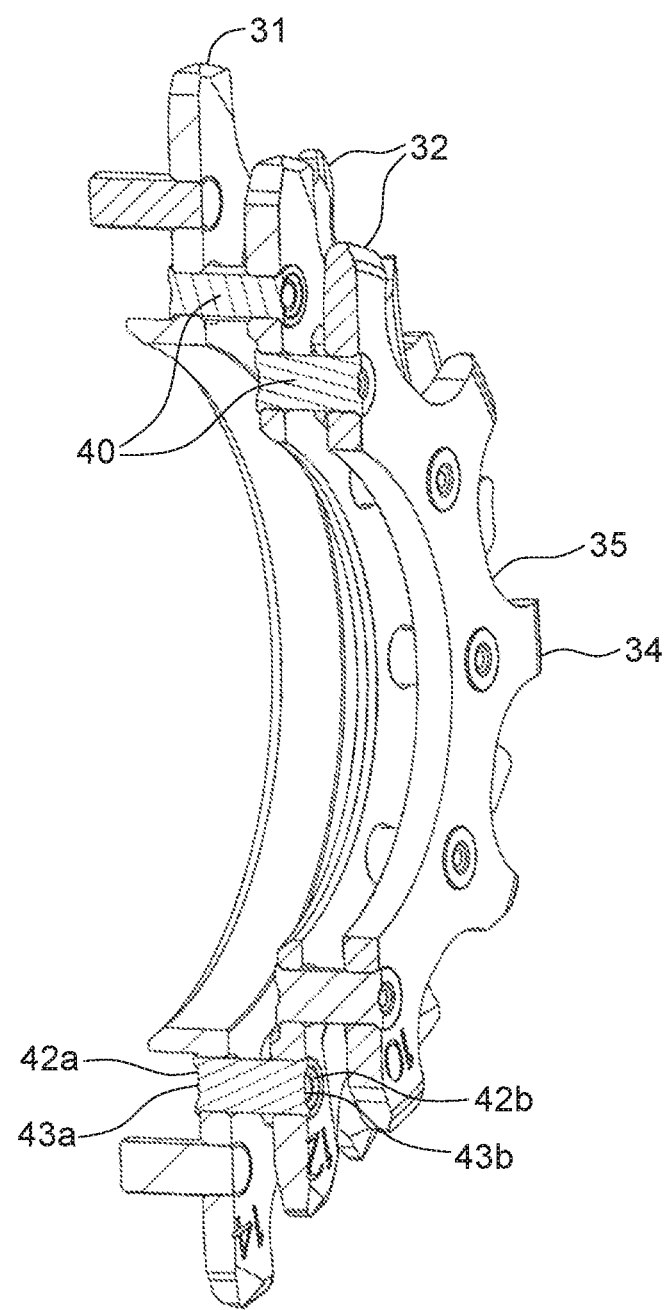
FIG. 2 shows a perspective sectional view of a part of the sprocket assembly from FIG. 1b, viewed from the side of the smallest sprocket.

FIG. 2 shows a perspective sectional view of the three smallest sprockets 31, 32 of the sprocket assembly 30 from FIG. 1b in a state in which they have not been installed on the holding body 20. The two second sprockets 32 are connected in frictionally fit and form-fitting fashion both to one another and to the first sprocket 31 by way of pins 40. The deformed pins 40 have cutouts 43a, 43b on their ends 42a, 42b. By contrast, the first sprocket 31 is connected in the direction of the next larger sprocket (not illustrated) by way of relatively simple, non-deformed pins without cutouts. The connection in said direction is a purely frictionally fit connection. In this case, the combination of a purely frictionally fit connection of the preloaded sprocket and of a frictionally fit and form-fitting connection of the self-supporting sprocket is adequate. A particularly stable connection could however be realized by way of a frictionally fit and form-fitting connection throughout.

Figure 3:
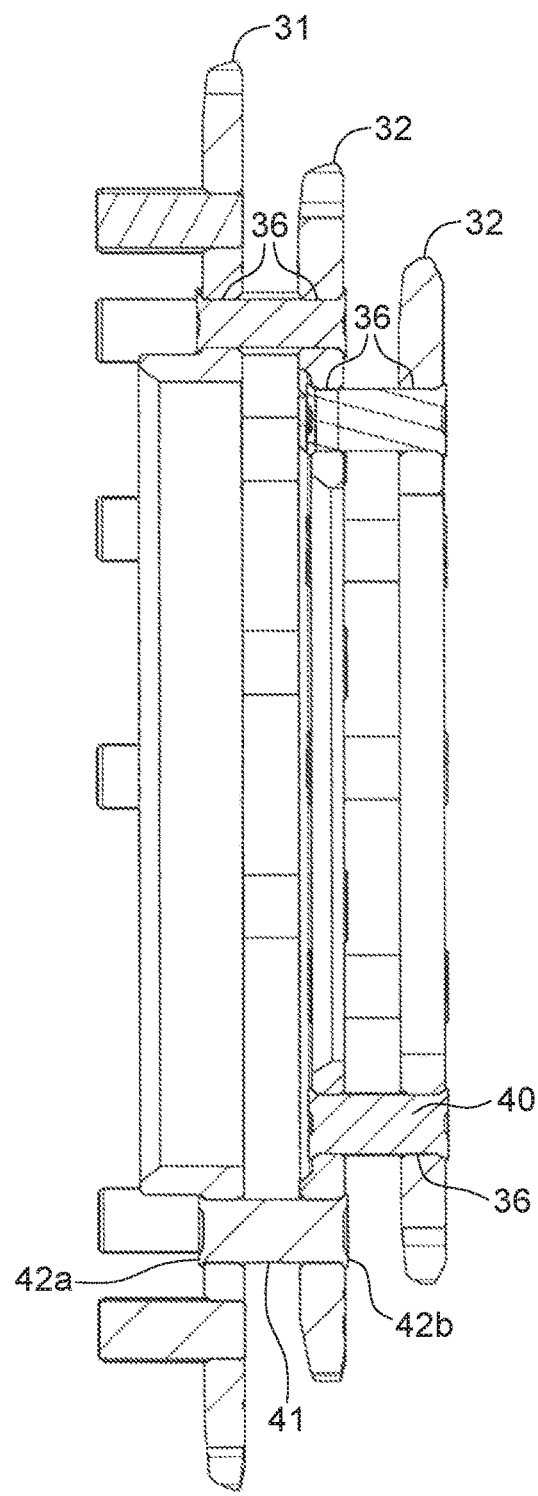
FIG. 3 shows a sectional view of the sprocket assembly as per FIG. 2.

In FIG. 3, the side view of FIG. 2, it is possible to see the first diameter d1 in the central part 41 and the second diameter d2 at the ends 42a, 42b of the fastener 40. The first diameter d1, which is reduced as a result of the pressing-in and shearing-off action, and the beads thus generated, are not illustrated owing to the very small dimensions. It can however be seen that the second diameter d2 at the ends 42a, 42b is considerably larger than the hole diameter L1 of the drilled holes 36 in the first and second sprockets 31, 32.

As can be clearly seen in FIG. 1a, FIG. 2 and FIG. 3, the smallest sprocket 32 and the largest sprocket 31 (terminating sprockets) are each connected to only one adjacent sprocket. The terminating sprockets therefore have only one row of drilled holes 36. All of the other sprockets are connected to in each case two adjacent sprockets, specifically a next larger sprocket and a next smaller sprocket, and have in each case two rows of drilled holes 36—a radially inner row of drilled holes 36 and a radially outer row of drilled holes 36. The radially inner row of drilled holes 36 is positioned where the pins 40 of the next smaller adjacent sprocket end. The radially outer row of drilled holes 36 is positioned where the pins 40 of the next larger adjacent sprocket end. Correspondingly, the smallest sprocket 32 has only one row of drilled holes 36, specifically the radially outer row, which are aligned with the radially inner row of drilled holes 36 of the single adjacent next larger sprocket. The radially outer drilled holes 36 are arranged such that there is adequate radial spacing between the drilled hole 36 and the tooth root 35 of the teeth 34. In this way, the drilled holes 36 are adequately surrounded by material of the tooth 34, and the pins 40 do not collide with the outer and inner links of the bicycle chain which pass to the side of the tooth 34 when the chain is in engagement. In the case of the small sprockets, the drilled holes 36 are preferably assigned to every tooth 34, and in the case of the relatively large sprockets, the drilled holes 36 are preferably assigned to every second tooth 34. Other assignments are however also possible. For example, in the case of sprockets with an odd number of teeth, it is also possible for a drilled hole to be assigned to only every third tooth. The shift lanes (not illustrated here) of the sprockets are preferably manufactured so as to be free from drilled holes.

Figure 4:
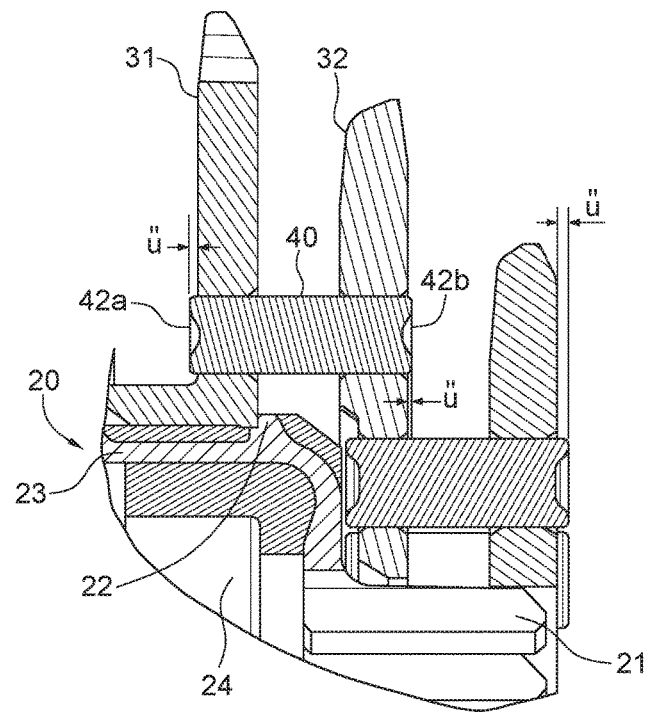
FIG. 4 shows an enlarged detail of a sectional view of the multi-sprocket arrangement in the non-riveted state.
Figure 5A:
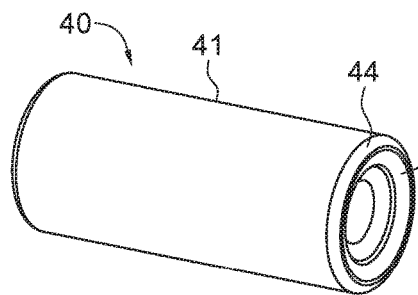
FIGS. 5a and 5b show perspective views of the fastener in the non-deformed and deformed states, respectively.
Figure 5C:
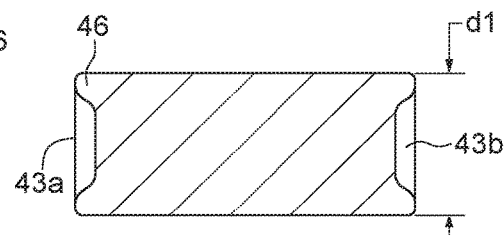
FIGS. 5c and 5d show sectional views of the fastener in the non-deformed and deformed states, respectively.
Figure 5B:
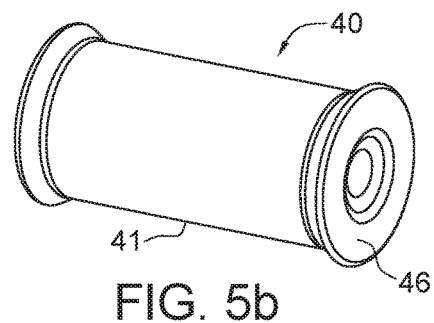
Figure 5D:
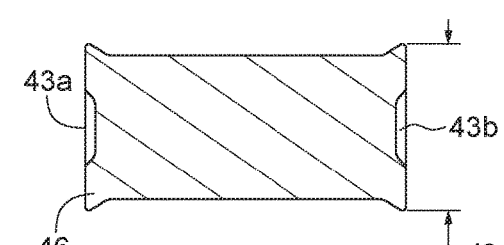

FIG. 4 shows an enlarged detail of a sectional view of the multi-sprocket arrangement in a non-riveted state. The first sprocket 31 is fixed radially and axially to the terminating sleeve 23. The axial fixing is realized at the abutment 22. The pin 40 has a first diameter d1 over its entire extent in the non-deformed or non-riveted state. The pins 40 are pressed together with the sprockets 31, 32 such that both ends 42a, 42b protrude beyond the sprocket surfaces slightly in an axial direction. Said projecting length Ü is, in the next installation step, deformed by way of a pressing action, such that a form-fitting connection between pin 40 and sprockets 31, 32 is realized.

FIGS. 5a, 5b, 5c, and 5d show perspective views and sectional views of the pin 40—on the one hand in the non-deformed state, and on the other hand in the deformed state. In its original form, that is to say before being pressed together with the sprocket and before being deformed at its ends, the pin 40 has a first diameter d1 over its entire extent. The cylindrical body has a first end 42a with a first cutout 43a and has a second end 42b with a second cutout 43b. At both ends 42a, 42b there is situated a rivet collar 46, the shape of which is defined by the cutout 43 and the radius 44. The radius 44 facilitates the capture and pressing-in of the pin 40 in the drilled hole 36.

In the direct comparison, the change in diameter from the first diameter d1 to the second diameter d2 is particularly clear. The diameter preferably increases from approximately 2.54 mm to 2.69 mm-2.89 mm. The rivet collar 46 is forced outward, such that, altogether, the pin 40 is slightly shortened but is widened at its ends 42a, 42b. Depending on the shape of the rivet collar, a deformation may be realized by way of either a flat tool or a tool of some other shape. The targeted shape of the rivet collar 46 permits a deformation using a flat press. If the pin were formed without a cutout and without a rivet collar, a deformation would nevertheless be possible, but using a more cumbersome tool, for example by flaring by way of a conical mandrel.

Figure 6:
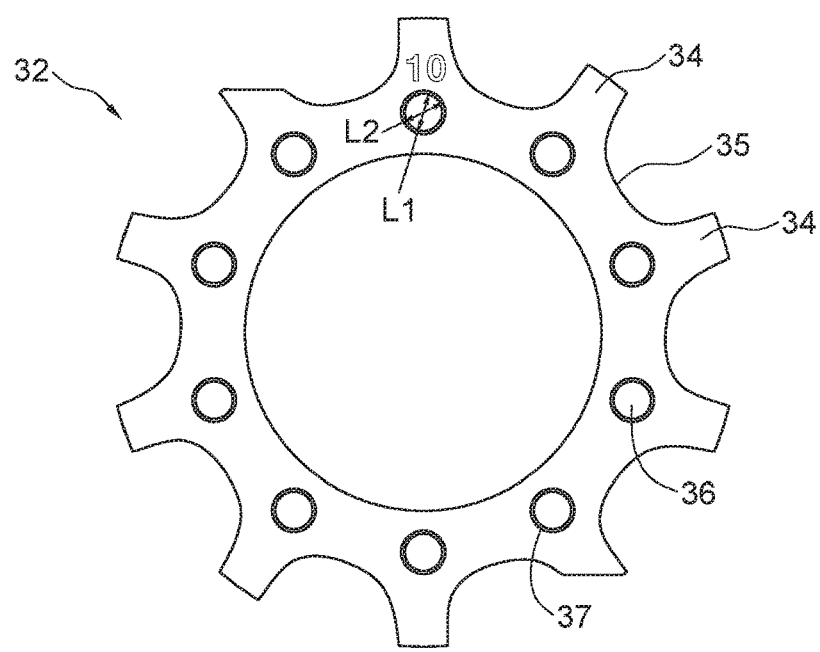
FIG. 6 shows a sprocket with drilled holes.

FIG. 6 shows the smallest sprocket 32 with teeth 34 and with tooth roots 35 arranged between the teeth 34. Each of the teeth 34 is assigned a drilled hole 36. The drilled hole 36 has a hole diameter L1 and a second, outer hole diameter L2. The outer hole diameter L2 is defined by the bevel 37. The bevel 37 is formed either directly during the punching process by the punching indentation, or may be manufactured or reworked after the punching process. In general terms, the deformation of the pin ends 42 can be controlled by way of the design of the bevel 37 at the drilled hole 36 and by way of the rivet collar 46 of the pin 40. A bevel angle of 45 degrees with a bevel depth of 0.2 mm has proven to be particularly advantageous. The deformed pin end preferably lies within the bevel 37, such that the deformed ends scarcely protrude axially beyond the sprocket surfaces. The bevel 37 provides space for receiving the material of the deformed pin ends, and also facilitates the deformation of the ends. The chain does not collide with the deformed ends, and can run along the sprocket without disruption.

Figure 7:
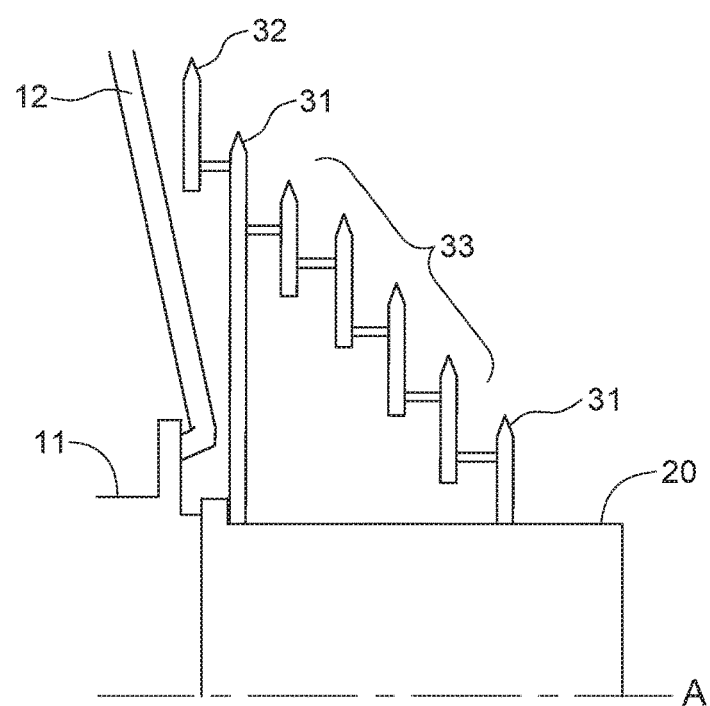
FIG. 7 is a schematic illustration of a second embodiment of the multi-sprocket arrangement, with the largest sprocket being of self-supporting design.
Figure 8:
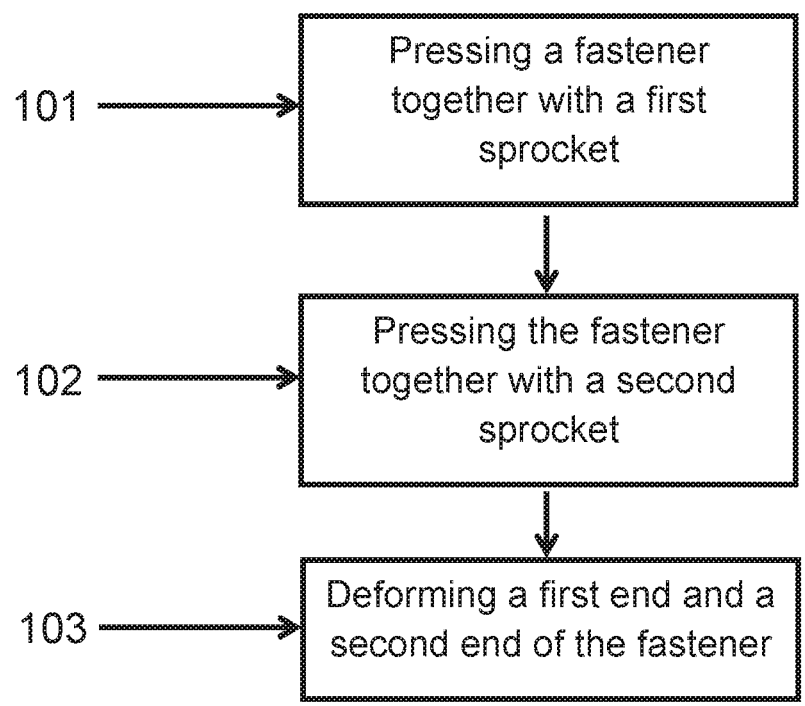
FIG. 8 shows flow chart diagram of a method for making a multi-sprocket arrangement.

FIG. 7 is a schematic illustration of a further embodiment of the multi-sprocket arrangement. In this embodiment, too, there are two first sprockets 31 which are arranged so as to be spaced apart from one another and which are supported radially and axially on the holding body 20. Further sprockets 33 are arranged between the two first sprockets 31. In this case, self-supporting second sprocket 32 is the largest sprocket. The second sprocket 32 is arranged in an axial direction between the spokes 12 and the holding body 20. In other words, the second sprocket 32 is arranged axially further to the inside than the first sprocket 31. The first and second sprockets 31, 32 are likewise connected in frictionally fit and form-fitting fashion by way of fastener 40. To save weight, the second sprocket 32 is designed to be as narrow as possible in a radial direction, and does not extend as far as the driver. In this case, the larger first sprocket 31 is connected in torque-transmitting fashion to the driver.

The two illustrated embodiments (cf. FIG. 1a and FIG. 7) show multi-arrangements 10 with in each case two first sprockets 31 which are preloaded toward one another. Embodiments however also encompass multi-sprocket arrangements which have only one first sprocket, which is fixed radially and axially to the holding body. The first sprocket simultaneously constitutes the drive sprocket. One or more self-supporting second sprockets may then be arranged laterally to the left and/or to the right of the first sprocket. The frictionally fit and form-fitting connection between the first and second sprockets is realized, as described above, by way of separate fasteners, preferably by way of riveted pins.

Below, the various steps of the method for the frictionally fit and form-fitting connection of the first and second sprockets by way of the fasteners will be discussed once again in more detail. The figures relating to the first embodiment may be taken into consideration, in their entirety, for better understanding.

In the first step 101, the first end 42a of the fastener 40 is pressed into the drilled hole 36 of the first sprocket 31 (into the sprocket of larger diameter). After the pressing-in process, the fastener 40 protrudes axially beyond the surface of the sprocket 31 to a defined extent. Said fastener can also be said to have a defined projecting length Ü relative to the surface of the sprocket 31. Before the pressing-in process, the fastener 40 has a first diameter d1 which is slightly larger than the hole diameter L1 of the drilled hole 36 in the first sprocket 31—a so-called oversize. The pressing-in force is approximately 6500 N per fastener. Correspondingly, in the case of 10 fasteners being pressed in simultaneously, a pressing-in force of 65,000 N must be applied. The frictional fit is influenced by the oversize but also by the quality of the punch surfaces in the drilled hole 36. Depending on the manufacturing quality of the drilled hole 36 and of the pin 40, the pressing-in force may however vary, and may in some cases lie below the 6500 N. Within the tolerance limits, a secure frictionally fit connection is nevertheless ensured. Particularly good shearing-off of the pin along the edge of the drilled hole 36 is ensured if the sprocket is formed from a harder material than the pin 40. It would also be conceivable for only the material around the drilled hole 36 to be composed of a harder material. The fastener 40 is sheared off when it is pressed into the drilled hole 36 of relatively small diameter, that is to say the diameter d1 of the fastener decreases slightly during the pressing-in process, such that, after the pressing-in process, the first end 42a is slightly smaller than the first diameter d1. A so-called interference fit or oversize fit is realized, which leads to a frictionally fit connection between the fastener and the sprocket. For a stable connection, the frictionally fit connection between sprocket and fastener preferably withstands a pressing-out force of approximately 1400 N. The sheared-off material of the fastener (defined by the oversize) leads to a material accumulation, or the formation of a bead, along the drilled hole 36. After the pressing-in process, the pin 40 thus protrudes on one side of the sprocket 31 correspondingly to the projecting length Ü, and on the other side of the sprocket 31, a bead has formed owing to the shearing-off process.

In the second step 102, the second sprocket 32 is pressed by way of its drilled holes 36 onto the second ends 42b of the fastener 40. For the pressing-on action, the first ends 42a, which protrude to a defined extent, of the fastener 40 are supported on an assembly surface. The first sprocket 31 does not need to be in contact with the assembly surface. The second sprocket 32 is pressed on to such an extent that the second ends 42b of the fastener 40 also have a defined projecting length Ü relative to the surface of the second sprocket 32. Depending on the deformation process, an axial projecting length may however also be undesired or unnecessary; in that case, it is also possible for a flush termination to be formed.

The dimensions and pressing-in forces are in this case the same as in the first step. Shearing at the second end 42b of the fastener 40, and the formation of a bead, likewise occur. Thus, two adjacent sprockets which are connected to a fastener 40 have, on their inner surfaces that face toward one another, small beads which prevent an axial movement of the adjacent sprockets toward one another under operating load.

In the third step 103, the two axially protruding ends 42a, 42b are deformed such that the diameters thereof increase to the second diameter d2. The deformation of the ends may be realized by squeezing, pressing, crimping, expanding, spreading (riveting) etc. By way of the deformation of the ends 42a, 42b, the diameters thereof increase beyond the hole diameter L1 of the drilled hole 36, such that a form-fitting connection is produced between the fastener 40 and the sprocket 31, 32. The deformation of the two ends is preferably performed simultaneously. The deformation force of 7000 N is applied simultaneously from both sides, and prevents the fastener 40 from being inadvertently pressed out. Owing to the form-fitting connection, adjacent sprockets can no longer move apart from one another. A detachment of the self-supporting sprocket in an (outward) axial direction is prevented.

The pin preferably has cutouts 43 on its ends 42. The cutouts 43 may be of frustoconical form and facilitate the defined deformation of the pin ends 42. By way of the cutout 43, a rivet collar 46 is formed. For the deformation process, an axial pressing force is applied to both pin ends simultaneously by way of pressing punches. Owing to the rivet collar 46, a defined deformation can be realized even using a flat punch. This has the advantage that the punch does not have to be machined.

Alternatively, the cutouts may also be utilized for the guidance or positioning of a tool in order to deform the ends. Flaring of the pin ends by way of a conical mandrel would be conceivable. For this purpose, the conical mandrel is inserted into the cutout and flares the pin end the further it is pressed in. A conical mandrel may theoretically also be pressed into a pin without a cutout, or into a pin with only a small bore.

Alternatively, and in a similar manner, a hollow pin (also referred to as tubular bolt) may be plastically deformed at its ends by crimping or flaring. For this purpose, a tool, in particular a punch or a crimping tool, is inserted into the opening of the hollow pin from both sides and pressed together. By way of the pressure that is exerted, the ends of the hollow pin are deformed, such that an enlarged second diameter d2 is generated.

Alternatively, pins or flat bolts may be deformed by wobble riveting. In the case of wobble riveting, the tool is set down, in a wobbling motion, on the fastener and deforms the end in stepwise fashion. Here, the deformation force acts only on a part of the surface of the pin, and deforms said pin without inadvertently pressing it out of the drilled hole.

The pressing-in force in the first and second steps must lie below the deformation force or riveting force in the third step in order that premature deformation of the fastener is prevented. A pressing-in force of approximately 6500 N and a deformation force of approximately 7000 N have proven to be particularly advantageous. In all three steps, it is preferable for an axial force to be applied to the pin using a flat punch or a plate.

A combination of the above-described deformation methods is likewise possible. For example, the two ends may be deformed in different ways.

Depending on the setting of the parameters such as pin shape, hole shape, pin diameter, hole diameter, material characteristics, deformation forces, deformation process and deformation tool, the form-fitting connection between fastener and sprocket can be adapted in a precise manner to the corresponding requirements.

In the case of the sprocket being punched, a punching indentation is formed on that side of the sprocket at which the punch enters. By contrast, sharp edges form on the other side of the sprocket, at which the punch emerges again. In general terms, adjacent sprockets have drilled hole pairs (a drilled hole in the first sprocket and a drilled hole in the second sprocket) which are connected by a fastener. Ideally, those ends of a drilled hole pair which face toward one another have sharp edges which facilitate the shearing-off of the fastener for the frictionally fit connection. The mutually averted ends of a drilled hole pair have bevels which facilitate the deformation of the fastener for the form-fitting connection. The drilled hole pairs may be produced by punching, milling, casting or some other shape-imparting process. It is important that the dimensions and design of the drilled hole are of significance both for the frictionally fit connection and for the form-fitting connection.

Furthermore, the multi-sprocket arrangement may, in the assembled state, be provided with a surface coating, whereby the region of the pin outside the hole takes on a dimension which prevents the pin from being displaced in a longitudinal direction during use and prevents adjacent sprockets from performing a movement toward one another in an axial direction.

The invention claimed is:

1. A multi-sprocket arrangement for installation on a rear wheel axle of a bicycle, having:
   a holding body configured for installation on the rear wheel axle; and
   a sprocket assembly having:
   a first sprocket, fixable radially and axially to the holding body; and
   a second sprocket, which is of self-supporting design, and which is connected to the holding body via the first sprocket by way of a separate fastener, wherein the fastener:
   has a cylindrical shape;
   has a first end and a second end;
   extends parallel to the rear wheel axle;
   is frictionally fit into holes in the first and second sprockets such that axial movement of the first sprocket and of the second sprocket toward one another is prevented; and
   is additionally connected, at the first and second ends, in form-fitting fashion to the first and second sprockets such that axial movement of the first sprocket and of the second sprocket away from one another is prevented.

2. The multi-sprocket arrangement according to claim 1, wherein the fastener further comprises a central part having a first diameter, and wherein the first end and the second end have a second diameter.

3. The multi-sprocket arrangement according to claim 2, wherein the first diameter of the fastener is larger than a hole diameter of the holes.

4. The multi-sprocket arrangement according to claim 3, wherein the first diameter of the fastener is approximately 2.5 percent larger than the hole diameter of the holes.

5. The multi-sprocket arrangement according to claim 3, wherein the second diameter of the fastener is larger than the hole diameter of the holes.

6. The multi-sprocket arrangement according to claim 5, wherein the second diameter of the fastener is approximately 8 percent to 16 percent larger than the hole diameter of the holes.

7. The multi-sprocket arrangement according to claim 5, wherein the second diameter is generated by deformation of the first and second ends of the fastener.

8. The multi-sprocket arrangement according to claim 2, wherein the fastener further comprises a pin.

9. The multi-sprocket arrangement according to claim 8, wherein the pin has a first cutout at the first end and has a second cutout at the second end.

10. The multi-sprocket arrangement according to claim 9, wherein the pin has a rivet collar at its first and second ends.

11. The multi-sprocket arrangement according to claim 2, wherein at least one of the holes comprises at least one bevel configured to accommodate the fastener.

12. The multi-sprocket arrangement according to claim 1, wherein the second sprocket has a smaller outer diameter than the first sprocket.

13. The multi-sprocket arrangement according to claim 1, wherein the second sprocket has a larger outer diameter than the first sprocket.

14. A method for arranging sprockets for installation on a rear wheel axle of a bicycle, wherein the method comprises:

pressing in a first end of a fastener, having a first diameter, into a first sprocket having at least one first hole, in order to generate a frictional fit between the fastener and the first sprocket, such that the first end of the fastener protrudes axially beyond a surface of the first sprocket;

pressing in a second end of the fastener, having the first diameter, into a second sprocket having at least one second hole, in order to generate a frictional fit between the fastener and the second sprocket, such that the second end of the fastener protrudes axially beyond a surface of the second sprocket; and deforming the axially protruding first end and the axially protruding second end of the fastener such that the first and second ends of the fastener have a second diameter, wherein the second diameter is larger than the first diameter, in order to generate a form fit between the fastener and the first and second sprockets.

15. The method for arranging sprockets of claim 14, wherein the at least one first hole and the at least one second hole have a hole diameter, and wherein the first diameter of the fastener is larger than the hole diameter.

16. The method for arranging sprockets of claim 15, wherein a force to press in the fastener into the first sprocket is less than a force to deform the axially protruding first end of the fastener.

17. The method for arranging sprockets of claim 16, wherein the fastener is pressed into the at least one first hole of the first sprocket with a force of approximately 6500 N to generate the frictional fit, and wherein at least the axially protruding first end of the fastener is deformed with a force of approximately 7000 N to generate the form fit.

18. The method for arranging sprockets of claim 14, wherein the deforming of the axially protruding first end and the deforming of the axially protruding second end are performed simultaneously.

* * * * *